(12) United States Patent
Cordery et al.

(10) Patent No.: US 7,551,751 B2
(45) Date of Patent: Jun. 23, 2009

(54) WATERMARKING IMAGES WITH WAVEPACKETS ENCODED BY INTENSITY AND/OR PHASE VARIATIONS

(75) Inventors: Robert A. Cordery, Danbury, CT (US); Erik Schmidt, Kitchener (CA)

(73) Assignee: Pitney Bowes Inc., Stamford, CT (US)

( * ) Notice: Subject to any disclaimer, the term of this patent is extended or adjusted under 35 U.S.C. 154(b) by 831 days.

(21) Appl. No.: 10/929,588

(22) Filed: Aug. 30, 2004

(65) Prior Publication Data

US 2006/0045306 A1 Mar. 2, 2006

(51) Int. Cl.
*G06K 9/00* (2006.01)
(52) U.S. Cl. .................................................. 382/100
(58) Field of Classification Search ................ None
See application file for complete search history.

(56) References Cited

U.S. PATENT DOCUMENTS

| | | | |
|---|---|---|---|
| 4,910,460 A * | 3/1990 | Sebok .................. | 324/307 |
| 5,825,892 A | 10/1998 | Braudaway et al. | |
| 5,940,135 A * | 8/1999 | Petrovic et al. ............. | 348/473 |
| 6,185,312 B1 | 2/2001 | Nakamura et al. .......... | 382/100 |
| 6,317,115 B1 | 11/2001 | Yokomizo et al. | |
| 6,332,030 B1 | 12/2001 | Manjunath et al. .......... | 382/100 |
| 6,332,194 B1 | 12/2001 | Bloom et al. | |
| 6,385,329 B1 | 5/2002 | Sharma et al. | |
| 6,590,996 B1 * | 7/2003 | Reed et al. ................. | 382/100 |
| 6,711,276 B1 | 3/2004 | Yoshiura et al. ............. | 382/100 |
| 6,728,408 B1 | 4/2004 | Echizen et al. ............. | 382/232 |
| 6,804,379 B2 | 10/2004 | Rhoads ....................... | 382/101 |
| 6,823,455 B1 | 11/2004 | Macy et al. ................. | 713/176 |
| 6,993,151 B2 | 1/2006 | Tsai et al. ................... | 382/100 |
| 7,054,461 B2 * | 5/2006 | Zeller et al. ................. | 382/100 |
| 7,062,069 B2 * | 6/2006 | Rhoads ....................... | 382/100 |
| 7,065,237 B2 | 6/2006 | Murakami ................... | 382/137 |
| 2001/0040979 A1 | 11/2001 | Davidson et al. ............ | 382/100 |
| 2002/0009208 A1 * | 1/2002 | Alattar et al. ............... | 382/100 |
| 2002/0012445 A1 * | 1/2002 | Perry .......................... | 382/100 |
| 2002/0126870 A1 | 9/2002 | Wendt ......................... | 382/100 |
| 2002/0157005 A1 | 10/2002 | Brunk et al. ................. | 713/176 |
| 2002/0176114 A1 | 11/2002 | Zeller et al. ................. | 358/3.28 |
| 2003/0026453 A1 | 2/2003 | Sharma et al. ............... | 382/100 |
| 2003/0037075 A1 * | 2/2003 | Hannigan et al. ........... | 707/500 |
| 2003/0053653 A1 * | 3/2003 | Rhoads ....................... | 382/100 |

(Continued)

FOREIGN PATENT DOCUMENTS

WO 03/012727 A1 2/2003

(Continued)

OTHER PUBLICATIONS

Proceedings of the IEEE vol. 87, No. 7, Jul. 1999 Digital Watermarking for Telltale Tamper Proofing and Authentification XP-000914459.

*Primary Examiner*—Vikkram Bali
*Assistant Examiner*—Michelle Entezari
(74) *Attorney, Agent, or Firm*—Ronald Reichman; Angelo N Chaclas

(57) ABSTRACT

A phase space encoded watermark is applied to an image to guard against counterfeiting and/or unauthorized copying. The watermark is formed of wavepackets. An authentication message is encoded in the wavepackets by variations in one or both of the intensities of the wavepackets and the phases of the wavepackets.

4 Claims, 6 Drawing Sheets

U.S. PATENT DOCUMENTS

| | | | |
|---|---|---|---|
| 2003/0159046 A1 | 8/2003 | Choi et al. | 713/176 |
| 2003/0215112 A1 | 11/2003 | Rhoads et al. | 382/100 |
| 2004/0001608 A1* | 1/2004 | Rhoads | 382/100 |
| 2004/0030899 A1 | 2/2004 | Lee | 713/176 |
| 2004/0105569 A1 | 6/2004 | Sharma et al. | 382/100 |
| 2004/0128512 A1* | 7/2004 | Sharma et al. | 713/176 |
| 2004/0153649 A1 | 8/2004 | Rhoads et al. | 713/176 |
| 2004/0236951 A1 | 11/2004 | Zhao | 713/179 |
| 2005/0114668 A1 | 5/2005 | Haas et al. | 713/176 |
| 2006/0045306 A1 | 3/2006 | Cordery et al. | 382/100 |
| 2007/0053325 A1* | 3/2007 | Shin et al. | 370/335 |

FOREIGN PATENT DOCUMENTS

| | | |
|---|---|---|
| WO | 03/012727 A1 | 2/2003 |

* cited by examiner

WATERMARKING IMAGES WITH WAVEPACKETS ENCODED BY INTENSITY AND/OR PHASE VARIATIONS

CROSS-REFERENCE TO RELATED APPLICATION

This application is related to co-pending prior U.S. patent application Ser. No. 10/720,292 filed Nov. 24, 2003, and entitled "Detecting Printed Image Copies Using Phase-Space-Encoded Fragile Watermark", which is incorporated herein by reference.

BACKGROUND

This invention relates generally to the field of printed document security, and more particularly, to authenticating originality of documents using watermarks in a printed image on the documents.

Advances in the arts of photocopying and digital image scanning and printing have made it increasingly easy to make copies of printed documents with high fidelity so that it is difficult to distinguish between an original printed document and a photocopy or scanned-and-printed copy of the original document. These advances have implications in regard to such secure documents as postage meter indicia, paper currency, and event and travel tickets. Therefore, it is desirable to provide secure documents with printed images that incorporate special features, sometimes referred to as "fragile watermarks", wherein copying of the printed image results in changes of the feature in the copy relative to the original image in a manner that can be detected with a degree of reliability and convenience.

In the above-referenced related patent application, it was proposed to aid in detecting copying of an image by incorporating in the image a fragile watermark formed of wavepackets. As used herein and in the appended claims, a "wavepacket" refers to a periodic variation in grayscale reflectance, the period of the variation being described by a wavevector, applied to a region of an image, and includes a periodic variation based on a wavelet function as well as a periodic variation based on a sinusoidal function. As used herein and in the appended claims, a "wavevector" refers to a set of parameters that defines a wavelength and an orientation in two-dimensional space of a waveform. As described in the above-referenced patent application, a process of scanning and printing an image having such a watermark may result in a copy image in which the watermark is affected in a manner that can be detected to distinguish the copy image from an original image.

The present inventors have recognized that it may be desirable to further secure a watermark of this type from a sophisticated attack in which a malefactor attempts to reverse engineer and reconstruct the watermark and then to print counterfeit versions of the image with the reconstructed watermark. Therefore, it is an object of the present invention to provide a phase-space encoded watermark with an additional level of security that may deter, prevent and/or aid in detecting counterfeiting of the watermark.

SUMMARY

Accordingly, methods are provided for watermarking a printed image and for authenticating a watermarked image.

In one aspect, a method of applying a watermark to an image includes providing image data that represents the image, and providing a first message string that includes a first plurality of message bits and a second message string that includes a second plurality of message bits. The method further includes arraying the message bits of the first message string at points of a four-dimensional lattice formed as a product of a two-dimensional position-domain lattice and a two-dimensional frequency-domain lattice. The method also includes generating wavepacket data by convolving each of the message bits of the first message string with a respective watermark function in accordance with a position of the respective bit of the first message string in the four-dimensional lattice to form data corresponding to a respective wavepacket for each "1" bit of the first message string. In addition, the method includes modifying at least one of an intensity level and a phase of the respective wavepacket data for at least some of the "1" bits of the first message string to encode in the wavepacket data a message which corresponds to the second message string. Also, the method includes combining the modified wavepacket data with the image data to generate combined image data.

Pixel values of the combined image data may be transformed, and an image may be printed using the transformed pixel values. The printed image may be part of a postage meter indicium. The modifying of the wavepacket data to encode the second message string therein may include only intensity level modification, in which case phases of the wavepacket data are not modified, or may include only phase modification, in which case the intensity levels of wavepacket data are not modified, except perhaps uniformly as part of an overall watermark data or image data level adjustment. In some embodiments, the intensity level for the wavepacket data for each wavepacket is set at one of four levels, so that two bits of the second message string are encoded in each wavepacket as reflected in the respective intensity level of the wavepacket. The second message string may represent an encrypted message, such as an encryption of a postage meter number for the device which prints the watermark or an encryption of indicium-specific information such as the ascending register.

In a further aspect, a method is provided for determining whether a printed-image-under-examination (PIUE) is authentic. The PIUE includes a watermark formed of a plurality of wavepackets. The method includes scanning the PIUE to generate scanned image data. The scanned image data includes pixel data, and the pixel data includes gray scale values and represents the PIUE as a set of scanning pixels. The method further includes forming a plurality of data blocks from the scanned image data. Each data block consists of pixel data which corresponds to a respective region of the PIUE. The method also includes transforming the pixel data in at least some of the data blocks to obtain transform domain data. The method further includes applying a watermark detecting operation to the transform domain data for respective ones of the data blocks to detect at least one of (i) variations in intensity among the wavepackets, and (ii) variations in phase among the wavepackets. In addition, the method includes analyzing the detected variations in intensity and/or variations in phase to detect a message encoded with said variations in intensity and/or variations in phase.

The obtaining of the transform data may include applying at least one of a Fourier transform, a fast Fourier transform, a discrete cosine transform (DCT), and a wavelet transform to the pixel data.

The PIUE may be part of a postal indicium, and the regions of the PIUE to which the data blocks correspond may at least partially overlap with each other.

Where variations in phase among the wavepackets are detected, the method may further include presenting the detected variations in phase in the form of a color map comprising a plurality of colors each of which represents a respective phase.

A wavepacket watermark with message encoding by intensity level variations and/or phase variations among the wavepackets may substantially increase the difficulty of counterfeiting the watermark, thereby leading to improved security for images which include such wavepacket watermarks.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

In the method of the present invention, a watermark that is encoded in phase space is impressed on a gray scale image. In a further level of encoding, intensity levels and/or phases of the wavepackets which make up the watermark are varied to encode an authentication message. To determine whether a printed document is authentic, the printed document is scanned, and a block-by-block analysis of the resulting data is performed to detect variations in intensity and/or phase in the wavepackets of a watermark in the printed document. From the variations in intensity and/or phase, the authentication message is recovered to authenticate the document.

Figure 1:
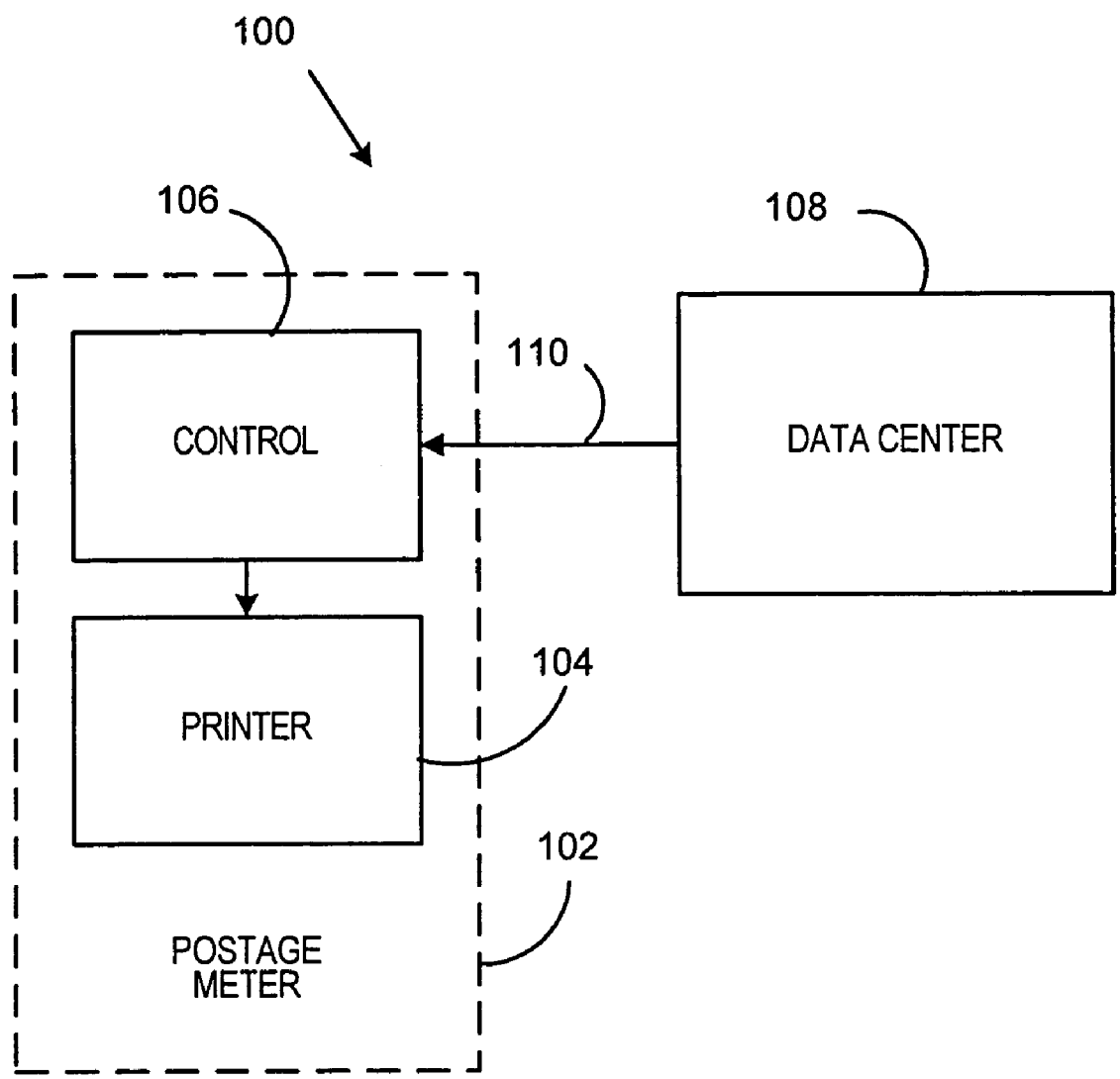
FIG. 1 is a block diagram that illustrates an apparatus provided in accordance with the invention for incorporating a watermark according to the invention in an image that is part of a postage meter indicium.

Referring now to the drawings, and particularly to FIG. 1, the reference numeral 100 indicates generally an apparatus for printing watermarked images in accordance with principles of the present invention. The printing apparatus 100 includes a postage meter 102. The postage meter 102, in turn, includes a printer 104 and control circuitry 106 that is coupled to, and controls operation of, the printer 104. (Although embodiments of the present invention are described herein in the context of postage metering, those who are skilled in the art will recognize that the methods of the invention may also be applied to production and verification of other types of secure documents, including paper currency, travel and event tickets, and identification documents. The invention may also be applied to authentication of images (e.g., video images) that are stored and/or displayed only electronically.) The printer 104 may be of a type that is capable of printing gray scale images. For example, the printer 104 may include a dye-sublimation printer. In some embodiments, the printer may be capable of printing 32 or 256 gray levels. In other embodiments the printer may approximate a gray scale image through dithering and/or dot-size variation.

The printing apparatus 100 also includes a data center 108 that is in communication with the control circuitry 106 of the postage meter 102 via a data communication channel 110. The data center 108 may generate a watermarked image in accordance with the invention, and may download to the postage meter 102 image data which represents the watermarked image. Using the downloaded image data, the postage meter 102 may print the watermarked image as a part of postage meter indicia applied to mailpieces, which are not shown. Thus the mailpieces, and particularly the postage meter indicia thereon, may constitute original documents which a postal authority may wish to authenticate. In some alternative embodiments, the postage meter may generate the watermarked image.

Figure 2:
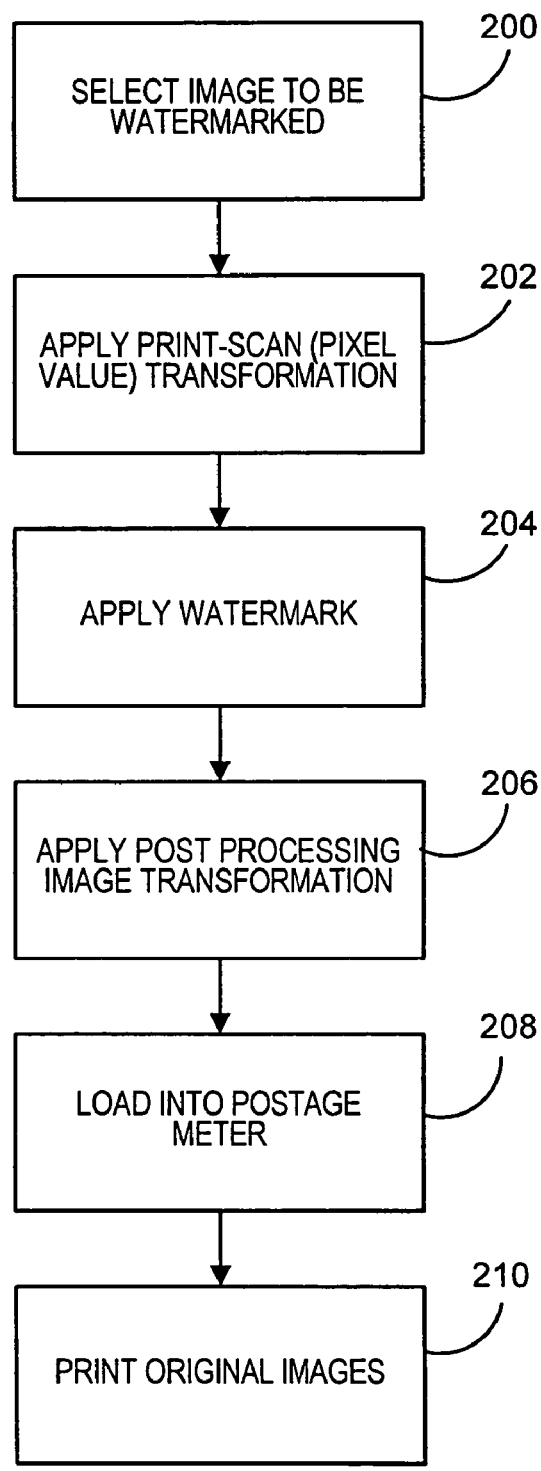
FIG. 2 is a flow chart that illustrates a process that may be provided in accordance with the invention for generating and printing watermarked images.

FIG. 2 is a flow chart that illustrates a process performed in accordance with the invention in the printing apparatus 100 of FIG. 1. In somewhat summary form, a watermarking process according to the invention may include preparing the image to receive the watermark, constructing the watermark using a set of wavepackets centered on points in a lattice, encoding an authentication message in the wavepackets by varying the intensity and/or phase of the wavepackets, adding the watermark to the image and post-processing the watermarked image to prepare the watermarked image for printing. A process according to the invention is now described in more detail with reference to FIG. 2.

Initially, at step 200, an image is selected for watermarking. In some embodiments the image may be a standard image that is required to be printed as part of every postage meter indicium by every postage meter, or by every postage meter that is part of a program for incorporating a gray scale image in postage meter indicia. In other embodiments, the image may be one of a number of standard images, any one of which may be selected by the lessor of a postage meter as the image to be incorporated in indicia to be printed by the particular postage meter. In still other embodiments, the image may be a gray scale image that is chosen by the lessor of the postage meter from among images available for purchase or licensing, or may be generated by the lessor of the postage meter. In these cases the selected image may be sent by the lessor of the postage meter to the data center for watermarking so that the image can be incorporated in indicia to be printed by the particular postage meter. In an alternative embodiment the postage meter can apply the watermark.

In some embodiments, the image to be watermarked may be represented by pixel data that represents, with respect to each pixel of the image, a gray scale level. The number of available gray scale levels may be 256, in some embodiments. In such embodiments, each pixel may be represented by one 8-bit byte of image data, and the value of each pixel may be an integer n, with n greater than or equal to zero and less than or equal to 255. Each value of n may correspond to a different gray scale level; in some embodiments the zero value corresponds to white (no tone), the value 255 corresponds to black, and each value of n corresponds to a tone which is darker than the tone which corresponds to n minus one.

In some cases it may be desirable to prepare the selected image before applying the watermark. For example, the contrast in the image may be reduced, low pass filtering may be applied to remove image features which may interfere with the watermark, and the resolution and format of the image may be converted to match a standard resolution and format.

A bitmap image has a limited grayscale often given as integers in a range such as 0-255 for an 8-bit depth image. The grayscale is a representation of the reflectance with 0 representing black or 0 reflectance and 1 representing white or 100% reflectance. The image may be filtered to remove features that interfere with the watermark. To simplify image processing calculations, the filtered image may be converted to the range [0, 1]. One simple type of linear filter is to Fourier transform the image, multiply each Fourier component by a factor which is 1 for long wavelength Fourier components and smaller for shorter wavelength components and then apply the inverse Fourier transform to the result. This process is equivalent to convolving the image with a blur function.

The Fourier transform and the inverse Fourier transform of an image I are $$FI = \mathcal{F}(I) = N \sum_x \sum_y e^{-i(xk_x + yk_y)} \cdot I(x, y)$$

$$I = \mathcal{F}^{-1}(FI) = N' \sum_{k_x} \sum_{k_y} e^{i(xk_x + yk_y)} \cdot FI(k_x, k_y)$$

where the normalization constants N and N' are chosen so that the inverse is correct.

Often the image pixels are on a rectangular lattice in position space with coordinates $(x, y) = (n_x/dpi_x, n_y/dpi_y)$, where $n_x$ and $n_y$ are integers. A good choice that behaves well in the continuum limit is N equals the area per pixel $1/(dpi_x dpi_y)$. With this choice and cyclic boundary conditions, if the image size is $L_x$ by $L_y$, then $(k_x, k_y) = 2\pi (m_x/L_x, m_y/L_y)$, and $N' = 1/(L_x L_y)$, where $m_x$ and $m_y$ are integers. N' is then the volume per wavevector times $1/(2\pi)^2$. Other choices for normalization may be used.

Figure 3:
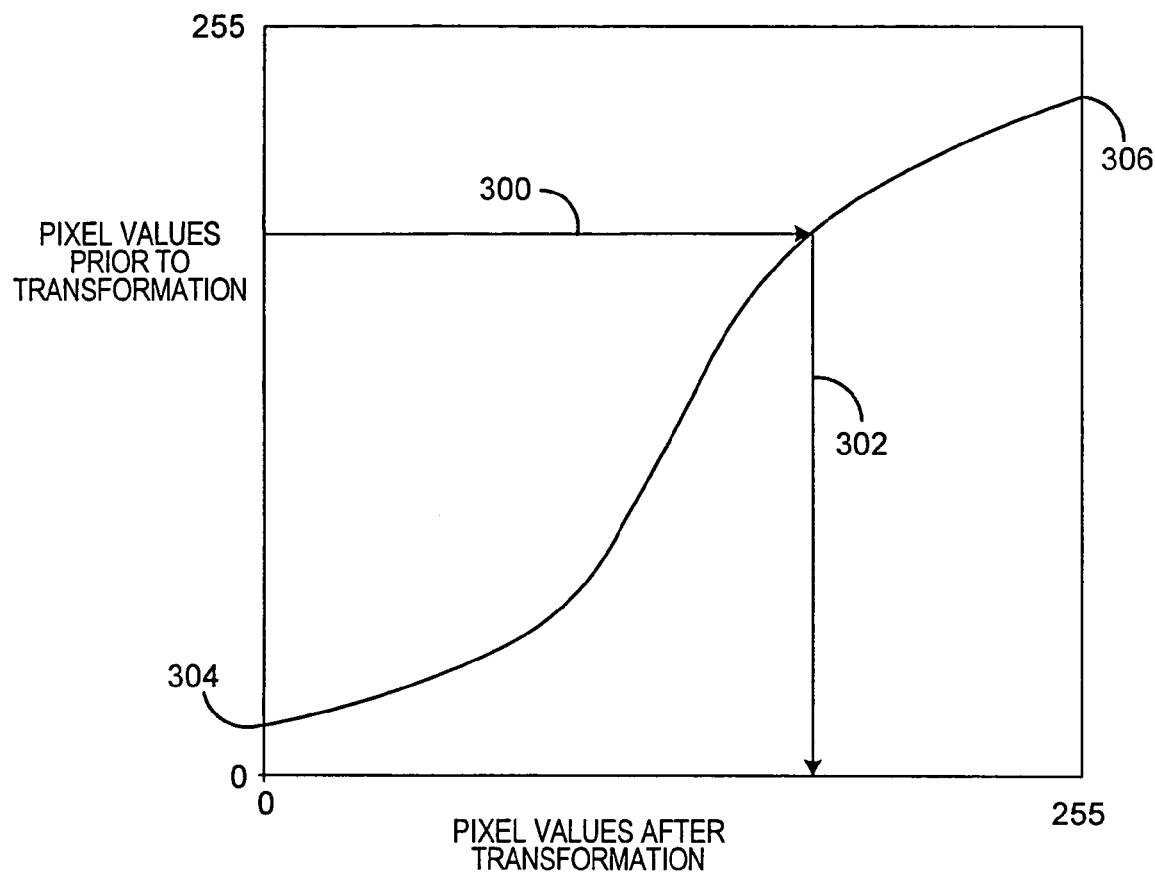
FIG. 3 is a graph that illustrates a transformation that may be applied to pixel values of an image to simulate changes in pixel values that may result from scanning a printed gray-scale image and then printing a copy of the image using data generated by the scanning of the printed image.

Following step 200 is step 202. At step 202 a pixel value transformation may be applied to the image data which corresponds to the image. The transformation may substantially approximate the effect on pixel values of first printing the image with the type of printer employed in the postage meter, and then scanning the resulting image with a scanner of the type which is to be employed to verify the postage indicia. FIG. 3 is a graph that illustrates an example of the transformation that may be applied at step 202. In the graph of FIG. 3, the vertical axis corresponds to pixel values prior to transformation, and the horizontal axis corresponds to pixel values to which the prior values are mapped by the transformation. Arrow 300 represents a particular pixel gray scale value that is to be transformed, and arrow 302 represents the gray scale value of the pixel after transformation. The possible pixel values to be transformed may be restricted to a range defined by a minimum gray scale level 304 that the printer is able to produce and a maximum gray scale level 306 that the printer is able to produce. The pixel value range may be scaled to allow head room for addition of watermark data to the pixel-value-transformed image data. Preferably the range re-scaling step is performed as the final step before printing.

Step 204 follows step 202 in FIG. 2. At step 204 a watermark is applied, in accordance with principles of the present invention, to the image selected at step 200, as transformed at step 202.

Figure 4:
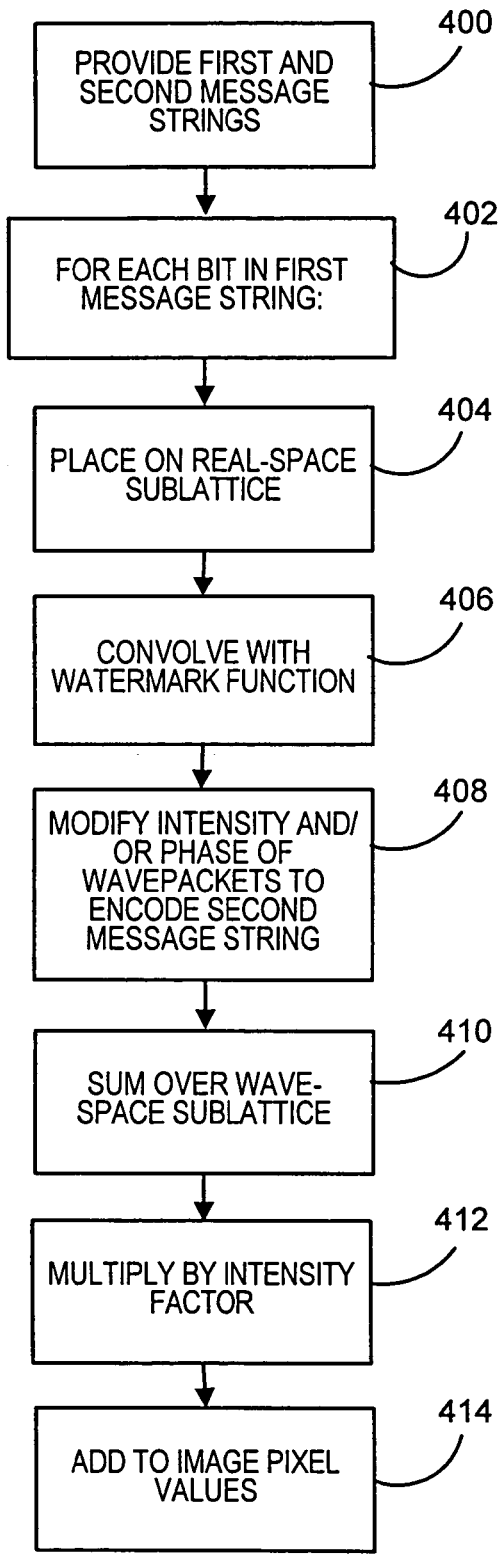
FIG. 4 is a flow chart that illustrates some details of a step of the process of FIG. 2.

FIG. 4 is a flow chart that illustrates some details of the watermarking operation represented by step 204 in FIG. 2. At 400 in FIG. 4, a first message string and a second message string are provided. The first message string may represent data such as postage meter serial number, location of mailing, etc. In some embodiments, the first message string may be all "1"s or a random set of data.

The second message string may correspond to an authentication message and may consist of data that may not readily be reproducible by a would-be counterfeiter. In some embodiments, the authentication message may be cryptographically derived from the postage meter number or from other information about the indicium to be printed by the postage meter. In addition or alternatively, the authentication message may be cryptographically derived from properties of the image (e.g., local area average gray scale levels) to which the watermark is to be attached. In addition or alternatively, the authentication message may be an arbitrary set of data generated and/or stored in the data center 108. In addition or alternatively, the authentication message may include error correction coding and/or a cryptographic checksum such as a conventional message authentication code (MAC).

The bits of the first message string may be arrayed at points in a watermark lattice. The watermark lattice may be a subset of a 4-dimensional lattice. The D4 lattice has the densest packing in 4 dimensions and so is a preferred lattice for encoding data. A convenient representation of the D4 lattice is a sublattice of the 4-dimensional hypercubic lattice with integer coordinates (j, k, m, n). The points on the hypercubic lattice with j+k+m+n even form a D4 lattice. Alternatively, a D4 lattice formed of the points on the hypercubic lattice with j+k+m+n odd may be used. By using one of such "checkerboard" lattices, the wavevectors used in adjacent cells may be different, thereby aiding in recovery of the watermark upon scanning and analysis of the printed image.

A 4-dimensional continuous phase-space is the product of the 2-dimensional image position space and the 2-dimensional wavevector space of the Fourier transform of the image. The coordinates of position space are the coordinates (x, y) of the image pixels. The coordinates of wavevector space are the $(k_x, k_y)$ wavevector of the Fourier transform. The coordinates of phase space are then $(x, y, k_x, k_y)$ An injection I is defined from the watermark lattice into the phase-space. The injection defines for each point on the watermark lattice a corresponding point in the phase space and thus a corresponding position and wavevector. A preferred injection is a linear map $$\begin{bmatrix} x \\ y \\ k_x \\ k_y \end{bmatrix} = M \begin{bmatrix} i \\ j \\ m \\ n \end{bmatrix} + \begin{bmatrix} x^0 \\ y^0 \\ k_x^0 \\ k_y^0 \end{bmatrix} \quad (1)$$

where M is a matrix. One form for M is a diagonal matrix with diagonal (celldim, celldim, kdim, kdim) where celldim is the spacing between cells and kdim is spacing in wavevector space of the wavepackets. A wavepacket that is very tightly localized in wavevector space is spread out in position space and vice versa. There is a constraint from Fourier transform theory that celldim kdim>2 π. This constraint places a limit on the number of wavevectors that can be used for a given cell dimension. Alternatively, the matrix M may be a general linear transformation including a rotation.

More specifically, for each bit in the array, steps 404 and 406 may be performed, as indicated at 402. At step 404 the data value corresponding to the bit is placed on the real-space sublattice in accordance with the indices rx, ry, then the data value is convolved with a watermark function (step 406). The watermark function may be, in some embodiments, a wavepacket. In other embodiments the watermark function may be a wavelet function. A wavepacket may be defined centered on each point in the range of the injection. This wavepacket may be concentrated in a limited wavevector range and a limited position range. A simple form for the wavepacket is Env(x, y) $\sin(k_x x + k_y y + \phi)$. Preferably, Env(x, y) is concentrated in a region with dimensions similar to the basis vectors of the rectangular lattice in position space defined by the injection. One choice for Env is a Gaussian. It is preferable to choose Env so that it is continuous and the sum over the two-dimensional lattice points l of Env($x-l_x$, $y-l_y$) is equal to one independent of x and y. This is referred to as a partition of unity.

It may be desirable to have the watermark fairly uniformly distributed over the image, without high peaks due to coherent adding of different wavepackets. The choice of $\phi$ can influence the uniformity of the watermark and can be selected based on a modest amount of experimentation to produce the most uniform watermarks. In other embodiments, it may be desirable to restrict the watermark to a central region of the image to avoid affects of noise introduced near the edges of the image during a detection (convolution) process. The watermark may be located relative to a reference feature in the image near the center of the image.

The lattice to be used in arraying the message bits may utilize values of kx, ky selected so as to avoid very short wavelengths and also to avoid long wavelengths at which the watermark and the image may interfere. The spacing of the real-space indices rx, ry may be selected to produce a cell size that is sufficiently large to allow for successful filtering of the watermark features. A typical cell size (i.e., block size) may be 20 pixels by 20 pixels. It is believed that a cell size of less than 10 pixels by 10 pixels may not produce satisfactory results. The blocks may overlap with each other (i.e., need not be discrete).

The result of steps 404 and 406, performed with respect to all of the bits of the first message string, is that wavepacket data has been generated, including respective wavepacket data for each "1" bit of the first message string. Step 408 then follows. At step 408, the authentication message is encoded into the wavepacket data by modifying one or both of the intensity levels and the phases of at least some of the wavepackets. For example, in a scheme that uses only modification of intensity levels, two bits may be encoded in each wavepacket according to the following system:

| Message value (binary) | Message value (base 4) | Intensity level |
|---|---|---|
| 11 | 3 | A (full intensity) |
| 10 | 2 | 0.875 × A |
| 01 | 1 | 0.75 × A |
| 00 | 0 | 0.625 × A |

Many other encoding systems may be used, including more or less than the three intensity levels referred to above and/or various phase variations. In some embodiments, a very large number of intensity levels may be employed, to encode a lengthy authentication message. The encoding may also be in the phase of the watermark. This can be accomplished by adding an extra column matrix—(message value)*[dx;dy;0, 0]—to equation (1) above.

Step 410 then follows. At step 410, the modified wavepacket data generated at step 408 is summed over the values of ky, kx to produce watermark data that represents a watermark "image". Then, at step 412, the watermark is multiplied by a constant so that the maximum and minimum values are within the range [−S, S] where S is a parameter substantially less than 1. Larger values of S>0.2 may result in fairly obvious watermarks, whereas smaller values less than 0.05 may result in watermarks that may be difficult to detect. The result is then added (step 414) on a pixel-by-pixel basis to the transformed image data that resulted from step 202.

After step 414 is performed, the application of the watermark indicated by step 204 in FIG. 2 is complete. Step 206 of FIG. 2 then follows. At step 206, the watermarked image is subjected to a pixel value transformation that is the inverse of the pixel value transformation that was applied at step 202. Alternatively, a different post-processing transformation may be applied to the watermarked image.

With the completion of step 206, the watermarked image data is now in condition for use in printing images, and may be loaded into the postage meter 102 (FIG. 1), as indicated at step 208 in FIG. 2. For example, the watermarked image data may be downloaded from the data center 108 to the control circuitry 106 of the postage meter 102 via the data communication channel 110. (Transmission of the watermarked image data from the data center 108 to the postage meter 102 may be protected by encryption.) Alternatively, the image data may be copied onto a floppy disk or other transportable data storage medium. The storage medium may then be mailed to the lessor of the postage meter and used to load the watermarked image data into the postage meter.

In some embodiments, the watermarked image data may be downloaded daily from the data center 108 to the postage meter 102 to allow the authentication message to reflect changing information such as the current date to be applied to the postage meter indicia.

In any event, once the watermarked image data is present in the postage meter 102, the control circuitry 106 may control the printer 104 to print watermarked images (step 210, FIG. 2), based on the watermarked image data, as part of postage meter indicia applied to mailpieces. Depending on the intensity of the watermark and the wavevectors selected for encoding, and also depending on the image to which the watermark is applied, the watermark may not visibly modify the printed image; but, under magnification, the watermark may be discernable as a network of moiré patterns across at least a portion of the image. The watermark data can be normalized to center around zero so that the watermark has no net affect on the gray scale level of the image.

In accordance with conventional practices, the postage meter indicia may include other information, including, e.g., postage amount, date, mailing location, postage meter serial number (all in human-readable form), a two-dimensional barcode, etc.

Figure 5:
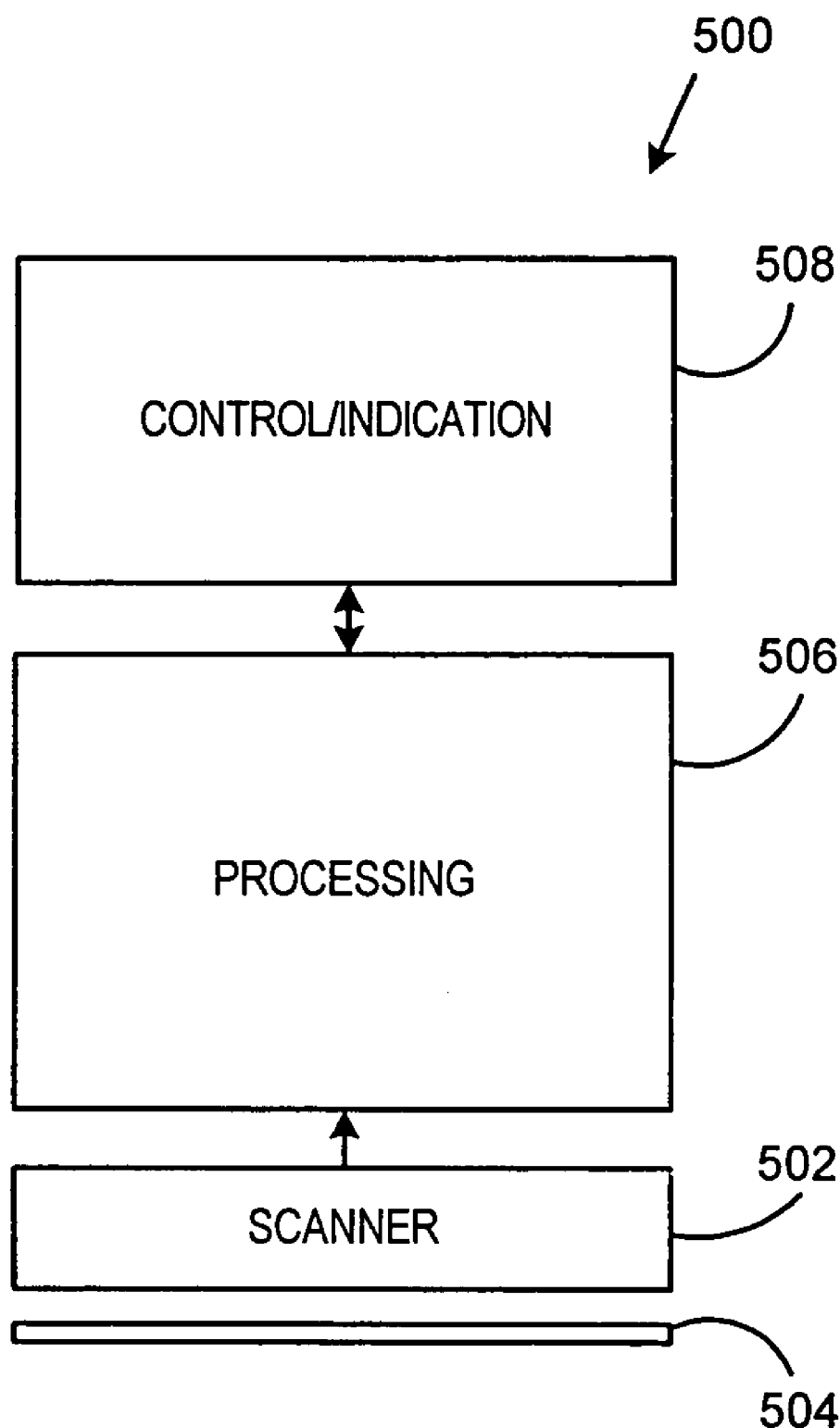
FIG. 5 is a block diagram of an apparatus that may be provided in accordance with the invention to examine printed images to determine whether the printed images are authentic.

FIG. 5 is a block diagram of an image examination apparatus 500 that may be provided in accordance with the invention to examine printed images (e.g., images included in postage indicia or purported indicia) to determine whether the printed images are authentic.

The image examination apparatus 500 may include a scanner 502 to scan a substrate 504 (e.g., a mailpiece) to generate scanned image data that represents a gray scale image (not separately shown) carried on the substrate 504. The printed gray scale image scanned by the scanner 502 may be referred to as the "printed-image-under examination" or "PIUE".

The image examination apparatus 500 further includes a processing block 506 that is coupled to the scanner 502. The processing block 506 may process scanned image data generated by the scanner 502, and may store scanned image data in a memory that is not separately shown and that may be part of the processing block 506. The processing block 506 may include program storage memory as well as working memory. The processing block 506 may further include memory for storing information for authenticating messages recovered from a watermarked image, such as cryptographic keys or random strings associated with a device.

The image examination apparatus 500 may further include a functional block 508 by which a user may enter signals to control operation of the image examination apparatus 500. The block 508 may also allow the image examination apparatus 500 to provide an indication of a result of the examination of the PIUE.

Figure 6:
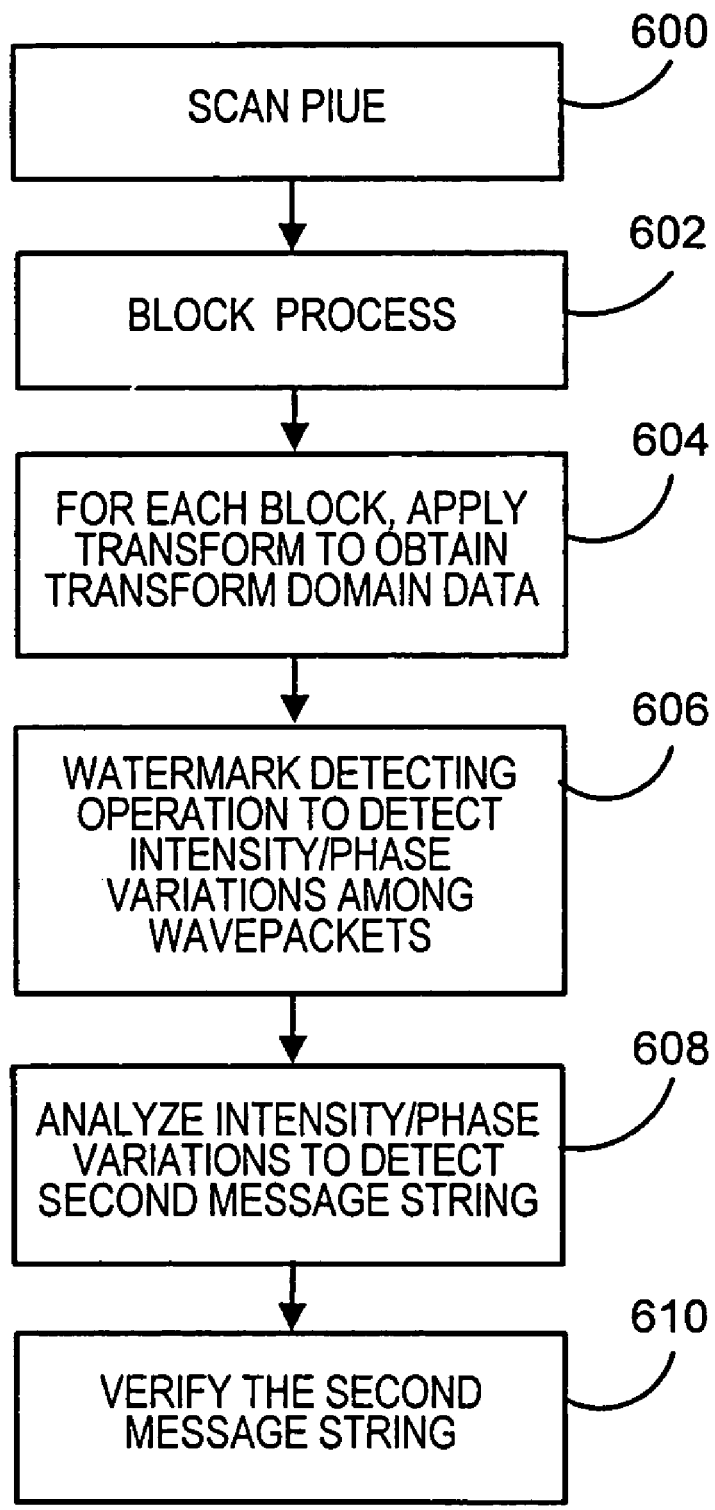
FIG. 6 is a flow chart that illustrates a process that may be provided in accordance with the invention to examine a printed image to determine whether the printed image is authentic.

FIG. 6 is a flow chart that illustrates a process that may be performed in accordance with the invention by the image examination apparatus 500 of FIG. 5 to examine a PIUE to determine whether the PIUE is authentic. In somewhat summary form, a process in accordance with the invention for detecting whether the PIUE is authentic may include scanning the PIUE, detecting the watermark wavepackets in the scanned PIUE, detecting variations in intensity and/or phase among the wavepackets, analyzing the intensity/phase variations to detect the authentication message encoded therein, and verifying the validity of the detected authentication message.

According to a first step 600 in the process of FIG. 6, the apparatus 500 scans the PIUE via the scanner 502 to generate scanned image data. The scanned image data is made up of pixel data that is constituted by gray scale values and represents the PIUE as a set of scanning pixels.

Following step 600 is step 602, at which the scanned image data is divided into data blocks. The data blocks may correspond to the real-space sublattice of the phase-space lattice that was used to encode the watermark in the image data that was provided for printing by the postage meter. In some embodiments, the data blocks may be overlapping.

Next, as indicated at 604, a transform is applied to the pixel data of each data block to obtain transform domain data therefrom. In some embodiments the transform is a fast Fourier transform. Other transforms may be used, such as a Fourier transform, a discrete cosine transform (DCT) or a wavelet transform. Next, at step 606, a watermark detecting operation is applied to the transform domain data obtained at step 604. The detection of the watermark includes convolving the scanned image with a detection function. The detection function has the form $EnvD(x, y) \exp[i (k_x x + k_y y)]$. Here EnvD is a similar function to Env. The absolute value of the correlation function shows peaks when the detection function is centered on the watermark wavepacket. The heights of these peaks provide a measure of the intensity of each wavepacket. The detecting operation may also provide phase information for each wavepacket. The operation at step 606 detects the variations in intensity and phase among the wavepackets of the watermark that is part of the PIUE.

At step 608 variations detected in the intensities and/or phases of the wavepackets are analyzed to detect the authentication message that has presumably been encoded in the wavepackets. In some embodiments, absolute identity of the detected message with the expected message may not be required to reach a conclusion of authenticity. Rather, the PIUE may be deemed authentic if there is a sufficient though somewhat inexact correlation between the detected message and the expected message. Verification of the authentication message is performed at step 610. The expected message may be a random string stored in the memory of processing block 506. Alternatively, the expected message may be cryptographically derived from other available information such as information in the indicium barcode. The cryptographic key for verifying such cryptographically derived information may be stored in the processing block 506.

With the encoding of an authentication message by varying intensities and/or phases of wavepackets in a phase-space encoded watermark, additional security may be provided against counterfeiting attacks. Also, if intensity encoding is employed, the authentication message may tend to be at least partially degraded by a scan-print copying attack, so that degradation of the authentication message may also be an indicator that the PIUE is a copy rather than an original. Thus the encoding of the authentication message in the wavepackets may add a layer of fragility to the watermark in addition to the type of fragility discussed in the above-referenced related patent application.

In some embodiments, the wavepackets may be applied to the image in a 10 by 10 array of blocks, with 6 wavepackets per block. Thus, if two bits are encoded in each wavepacket, an authentication message having a length of 1200 bits may be supported in these embodiments.

In some embodiments, if phase variations are employed in encoding the authentication message, the recovered phase variation information may be presented in the form of a color map, with each different color in the color map representing a different phase of the wavepackets. Such a presentation may make it particularly easy to recognize whether or not the PIUE is authentic.

It will be appreciated that a PIUE that has been printed and then scanned for examination will generally result in a set of scanned image data that is distorted as compared to the original image data. It is to prevent distortion of the watermark that the "inverse transformation" of step 206 is applied after application of the watermark. That is, the inverse transformation of step 206 in effect "pre-reverses" the distortion of the print-scan process, so that there is less distortion of the watermark as detected in the examination process of FIG. 10 than would be the case if step 206 were not included. At the same time, it is advantageous to include step 202, so that the appearance of the printed original image produced at step 210 is substantially similar to the image represented by the image data in its condition prior to step 202.

In some embodiments, fewer than all of the pixel blocks of the image data, and/or less than all of the image, may be subjected to the watermarking process. For example, certain parts of the image may be held back from watermarking to preserve esthetic qualities of the image. It is also possible, in some embodiments, that less than all of the PIUE may be examined for the presence of the watermark. Also, lattices other than the D4 lattice may be employed in arraying the message bits.

The phase-space encoded watermarking process described herein can be combined with other types of fragile watermarks, including for example the tonal watermark described in co-pending, commonly-assigned patent application Ser. No. 10/720,664 filed Nov. 24, 200, entitled "Fragile Watermark For Detecting Printed Image Copies".

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

A number of embodiments of the present invention have been described. Nevertheless, it will be understood that various modifications may be made without departing from the spirit and scope of the invention. The present invention may be applied, for example, to verification of documents other than postage indicia. Other variations relating to implementation of the functions described herein can also be implemented. Accordingly, other embodiments are within the scope of the following claims.

What is claimed is:

1. A method of applying a fragile watermark to an image, the method comprising:
    (a) providing image data that represents the image;
    (b) providing a first message string that includes a first plurality of message bits and a second message string that includes a second plurality of message bits;
    (c) arraying the message bits of the first message string at points of a four-dimensional lattice, the four-dimensional lattice being formed as a product of a two-dimensional position-domain lattice and a two-dimensional frequency-domain lattice;
    (d) generating wavepacket data by convolving each of the message bits of the first message string with a respective watermark function in accordance with a position of the respective bit of the first message string in the four-dimensional lattice, thereby forming data corresponding to a respective wavepacket for each "1" bit of the first message string;
    (e) modifying at least one of an intensity level and a phase of the respective wavepacket data for at least some of the "1", bits of the first message string to encode in the wavepacket data a message which corresponds to the second message string;
    (f) combining the modified wavepacket data generated at step (e) with the image data provided at step (a) to generate combined image data; and
    (g) printing the combined image data to produce the fragile watermark image so that the fragile watermark will be degraded when the fragile watermark image is scanned and reprinted.

2. The method according to claim 1, further comprising:
    transforming pixel values of the combined image data before the combined image data is printed.

3. The method according to claim 1, wherein the image is printed as part of a postage meter indicium.

4. The method according to claim 1, wherein the second message string represents an encrypted message.

* * * * *